United States Patent [19]

Sonnerat

[11] 4,357,058
[45] Nov. 2, 1982

[54] SELF-CENTERING THRUST BEARING ASSEMBLY

[75] Inventor: Claude Sonnerat, Annecy-le-Vieux, France

[73] Assignee: Societe Nouvelle de Roulements, Annecy, France

[21] Appl. No.: 210,667

[22] Filed: Nov. 26, 1980

[30] Foreign Application Priority Data

Dec. 4, 1979 [FR] France ................. 79 29788

[51] Int. Cl.³ ............... F16D 13/60; F16D 23/14; F16C 19/00
[52] U.S. Cl. ..................... 308/233; 192/98; 192/110 B
[58] Field of Search ........... 308/26, 29, 184 R, 184 A, 308/232, 233; 192/98, 110 B

[56] References Cited

U.S. PATENT DOCUMENTS

| 3,913,714 | 10/1975 | Camp ................. 192/110 B |
| 3,967,710 | 7/1976 | Ernst et al. ............. 192/98 |
| 4,029,186 | 6/1977 | De Gennes ............ 308/233 |
| 4,059,179 | 11/1977 | Ernst et al. ............. 308/233 |
| 4,093,053 | 6/1978 | Ernst et al. ............. 192/98 |
| 4,243,130 | 1/1981 | Vinel et al. ............ 192/110 B |

FOREIGN PATENT DOCUMENTS

| 2811195 | 9/1979 | Fed. Rep. of Germany ........ 192/98 |
| 1441804 | 7/1976 | United Kingdom ................. 192/98 |

Primary Examiner—Richard R. Stearns
Attorney, Agent, or Firm—Fleit & Jacobson

[57] ABSTRACT

A self-centering thrust bearing assembly, in which the bearing comprises one ring intended to cooperate with a driving unit of the clutch assembly, whereas its other ring is mounted on an axial movable support driven for the clutching operation, said mounting being provided with a certain radial clearance and a resilient pinching action in axial sliding rest on said support. The pinching action is substantially carried out by first fastening means exerting a pinching stress localized from the ring to the support so that it constitutes for the ring the center of a pivoting movement which is superposed to the radial sliding clearance for the self-centering process.

3 Claims, 10 Drawing Figures

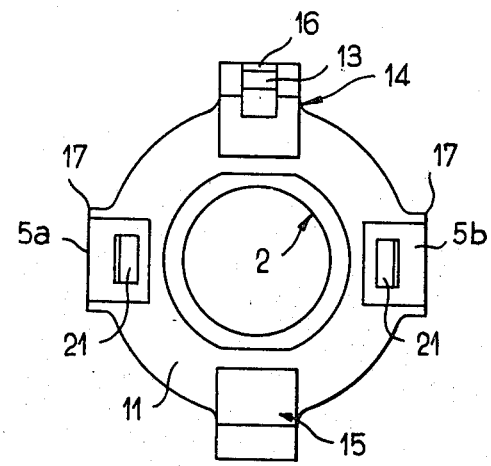
FIG_2
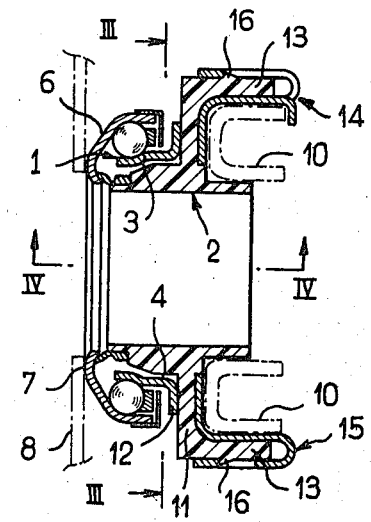
FIG_1
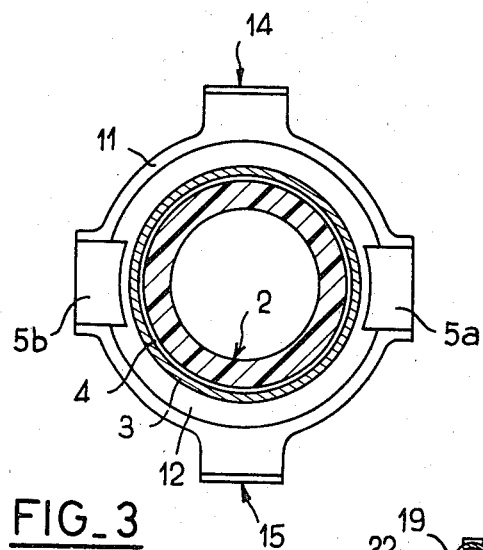
FIG_3
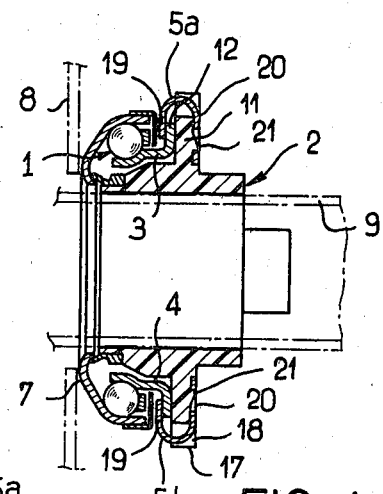
FIG_4
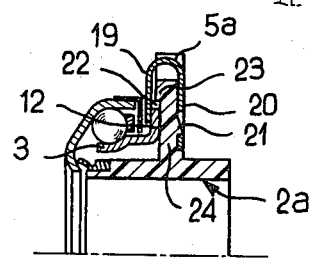
FIG_5

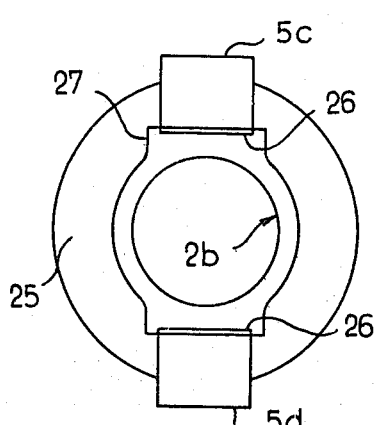
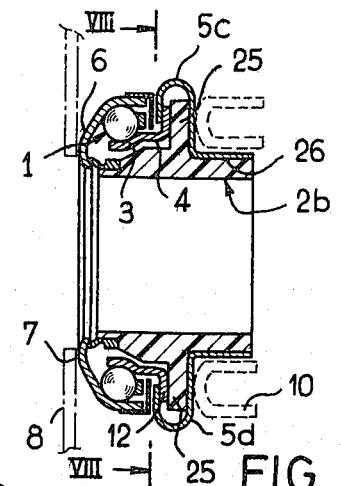
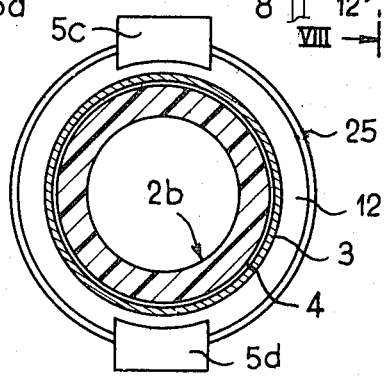
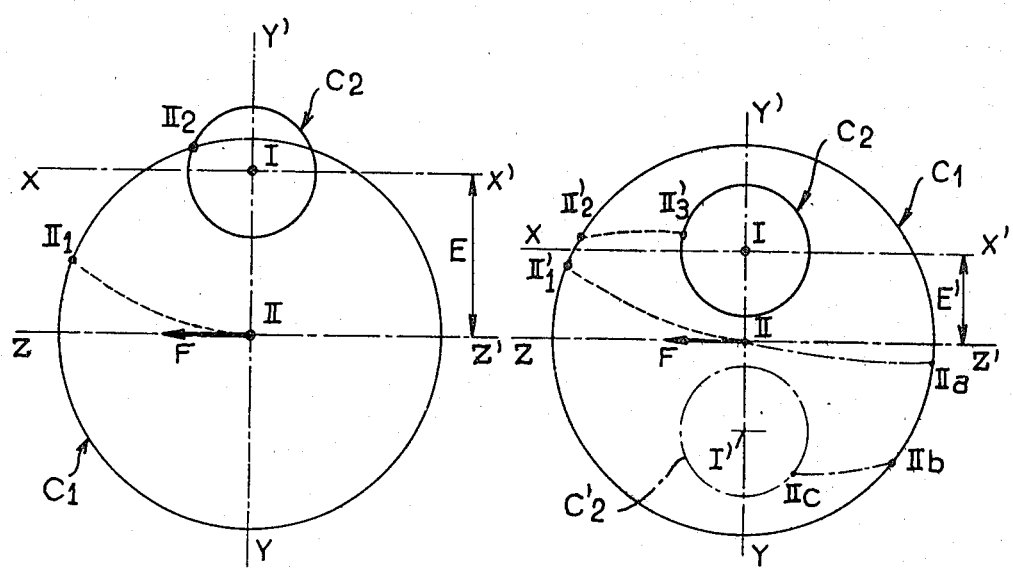

SELF-CENTERING THRUST BEARING ASSEMBLY

The invention relates to a self-centering thrust bearing assembly.

In order to obviate slidings, which generate a wearing effect between a thrust bearing and the unit with which it cooperates, for example a diaphragm, these slidings being due to the geometrical defect inherent to the mounting of the axes of the clutch and for guiding the thrust-bearing, respectively, it is known to mount the bearing of the thrust assembly with a certain radial clearance on a guided support which may be axially displaced when the clutch is operated, and this for enabling the bearing to be self-centered.

This arrangement is especially important for the clutch assemblies wherein the thrust-bearing continuously rests on the unit with which it cooperates.

Self-centering thrust bearings are already known in which provision is made, for the self-centering action, of a certain radial clearance in the mounting of the non-rotative ring on its support, said clearance being associated with a resilient pinching effect for holding said ring in axial sliding rest relation on said support.

However it has appeared that mounting arrangements of this type did not provide the desired self-centering effect and operate with undesirable residual slidings, especially according to the stresses exerted for obtaining the desired self-centering effect either under the rest pressure of the thrust bearing or under the amount of the aforesaid geometrical defect.

The present invention is directed to an improved self-centering thrust bearing assembly, which obviates the aforesaid disadvantages, in which the bearing comprises one ring intended to cooperate with a driving unit of the clutch assembly, whereas its other ring is mounted on an axial movable support driven for the clutching operation, said mounting being provided with a certain radial clearance and a resilient pinching action in axial sliding rest on said support, said thrust bearing assembly being further characterized in that said pinching action is substantially carried out by first fastening means exerting a pinching stress localized from the ring to the support so that it constitutes for the ring the center of a pivoting movement which is superposed to the radial sliding clearance for the self-centering process.

The arrangement according to the invention enables the desired self-centering effect to be obtained with the whole axial clearance range suitable for compensating the geometrical defect of alignment of the aforesaid mounting.

Preferably, according to the invention, provision is made of a second pinching fastening means which is diametrically opposite to the aforesaid first fastening means and exerts however a pinching stress of the ring on the support lower than that of the aforesaid first fastening means, and which may be useful as an additional operating member having a damping effect on the ring pivoting in the self-centering process.

Further, in the latter case, both fastening means may be so designed for operating, on the support face opposite the rest face of the pinched ring of the bearing, as units of cooperation for a control fork of a driving clutch assembly.

A few embodiments of a thrust bearing assembly according to the invention will be hereinafter described by way of example and with reference to the accompanying drawing, in which:

FIG. 1 is an axial horizontal cross-section of a first embodiment of a thrust-bearing assembly according to the invention, shown when mounted;

FIG. 2 is a back view, after left folding, of the thrust bearing assembly shown in FIG. 1;

FIG. 3 is a cross-section of the thrust bearing assembly according to line III—III in FIG. 1, after right folding;

FIG. 4 is an axial cross-section of the thrust bearing assembly according to line IV—IV in FIG. 1;

FIG. 5 is a half-view along a section similar to that of FIG. 4, of an alternative embodiment of the thrust bearing assembly;

FIG. 6 is an axial horizontal cross-section of a third embodiment of a thrust bearing according to the invention, shown when mounted in position;

FIG. 7 is a back view after left folding of the thrust bearing shown in FIG. 6;

FIG. 8 is a cross-section of the thrust bearing along line VIII—VIII in FIG. 7, after right folding; and FIGS. 9 and 10 are two views illustrating the self-centering effect obtained with a thrust bearing assembly according to the invention.

As shown in FIGS. 1 to 4, the thrust bearing assembly mainly comprises a bearing designated by reference 1 as a whole, said bearing consisting of rings shaped from metal sheets and of balls with angular contact, and a support sleeve designated by 2 as a whole, one of said bearing rings 3 being mounted with a certain radial clearance at 4 on said support sleeve 2, and axially held thereon by means of resilient fasteners 5a, 5b, whereas the other bearing ring 6 being free to rotate and having a front surface 7 intended to cooperate with a unit for driving the clutch, for instance a usual diaphragm as shown in dotted lines at 8.

As a usual practice, the support sleeve 2 is intended to be slidably mounted on a guide tube shown in dotted lines at 9 in FIG. 4, and to be subjected to axial displacements on the latter during the clutch operations, said displacements being controlled by means of a fork the prongs of which are shown in dotted lines at 10 in FIG. 1.

Sleeve 2, herein made of a molded synthetic material, has a front face so designed as to be an axial sliding support surface for a flange 12 which is a constitutive portion of ring 3. Flange 11 of the sleeve is provided, at its periphery, with two opposite arms 13 which are downwardly directed and on which are engaged two metallic fasteners 14, 15 each secured to a retaining stop 16 as to form the surfaces for the cooperation of the thrust bearing with the prongs of fork 10.

Flange 11 of the sleeve 2 is provided at its periphery with two notched radial bosses 17, fasteners 5a, 5b being mounted within relative notches 18 as to form tongs having two arms in order to hold, by means of front arm 19, the flange 12 in axial sliding support relationship on flange 11 of the sleeve 2, whereas the back arm 20 is secured on a retaining stop 21 formed in the back face of flange 11.

Further, these fasteners 5a and 5b are so arranged that the pinching or axial holding stresses exerted by one of them on flanges 11, 12 (and which could be solely used as hereinbefore stated) is substantially higher than that exerted by the other one, in order to enable in any case an efficient self-centering effect to be obtained, as stated hereinafter.

FIG. 5 illustrates an alternative embodiment wherein the radial clearance 4 of bearing ring 3 instead of being internally limited by its cooperation with sleeve hub 2a is provided on said bearing ring periphery at 22, and limited by a circumferential front stud 23 on flange 24 which surrounds the sleeve 2 so modified.

FIGS. 6 to 8 illustrate another alternative embodiment wherein the support sleeve 2b of bearing 1 is modified in that its flange 25 is a mere circular one, whereas two fasteners 5c, 5d are intended to pinch flange 12 of bearing ring 3 and flange 25 as to form by the back arm thereof, folded at 90°, the surfaces of cooperation of the stop with the prongs of fork 10, whereas the axial portion of said arm angularly abuts in a corresponding notch 26 formed in a radial boss 27 which is provided on the back hub of the sleeve for each fastener.

FIGS. 9 and 10 illustrate with reference to the embodiment of FIGS. 1 to 4 two arrangements for providing the self-centering of a thrust-bearing according to the invention.

In these Figures:

reference I, at the intersection of X, X'; Y, Y' planes, illustrates the rotation axis of the clutch and of the diaphragm 8 thereof;

reference II, at the intersection of Y, Y'; Z, Z' planes, illustrates the mounting axis of guide tube 9 and accordingly the axis of the axial displacement of support sleeve 2 of the thrust bearing;

distance E (FIG. 9) and E' (FIG. 10) between the axes I and II is accordingly the eccentricity of bearing 1 of thrust bearing with respect to the axis I, said bearing being supposed to be centered by the previous mounting thereof on support sleeve 2.

When the clutch as well as its diaphragm are clockwise rotating, a stress F is thus to be exerted on rotating ring 6 in bearing 1. Taking into account the pivot ability of ring 3 with respect to fastener 5a which is located along axis Y', as well as the sliding rotative ability of Ring 3 is, for instance, to be radially moved along support sleeve 2 according to a path along which its axis is moving from II to $II_1$, i.e. at the limit of its radial clearance illustrated in the drawings by circle $C_1$ inside which the axis of bearing 1 can move about axis II.

Then starting from point $II_1$, the center of bearing 1 is continuously displaced clockwise along circle $C_1$.

In the case of FIG. 9, the center of bearing 1 is accordingly drawn to be closer to axis I until to be stopped at $II_2$, i.e. in a so close proximity with respect to axis I that the friction stress exerted by diaphragm 8 on ring 6 and intended to displace bearing 1 will be lower than the friction stress exerted by ring 3 on support sleeve 2, i.e. bearing 1 is considered as substantially self-centered with a negligible friction stress with respect to the diaphragm as regards the wearing to be avoided.

The minimal eccentricity surface area for picking up the bearing axis and corresponding to the desired self-centering effect is defined by circle $C_2$.

On FIG. 10 is illustrated the most general case corresponding to a mounting eccentricity E', such as circle $C_2$ picking up the bearing axis is within circle $C_1$ which represents the radial clearance of bearing axis 1. In this case again, the rotation of the clutch diaphragm 8 generates on ring 6 a force F transmitted to ring 3. Thus said ring 3 is originally displaced radially along a path whereas its axis is transferred from II to $II'_1$, i.e. at the limit of its radial clearance corresponding to circular area $C_1$. Then, starting from point $II'_1$, when ring 3 is supposed to be pinched under the same stress by fasteners 5a, 5b on the support sleeve 2, the guide tube 9 would be further driven clockwise along circle $C_1$ without having any chance to meet circle $C_2$ picking up the bearing axis in the minimal eccentricity position (a phenomena of this type would occur in any mounting device comprising at least three fasteners and having no similar clamping unit).

However, when using herein a fastener 5a substantially exerting an action for pinching ring 3 on support sleeve 2, it results therefore, that starting from the point where the guide tube 9 has trespassed upwards X-X', i.e. axis I, for instance starting from point $II'_2$, it moves no longer along circle $C_1$, since ring 3 is driven to pivot about a pivoting point constituted by the pinching pressure center of fastener 5a. As a result, bearing axis 1 is drawn to cross circle $C_1$ to meet circle $C_2$, as illustrated at $II'_3$. Thus said axis I is stopped within the minimal eccentricity surface area corresponding to the desired self-centering. In a symmetrical case, where circle $C_2$ is in dotted lines, the corresponding path is defined by II, $II_a$, $II_b$, $II_c$.

It should be noted that this intersection path for picking up circle $C_2$ may be even more direct when the circle $C_r$ is located substantially close to axis Z, Z'.

It has appeared that the location of a second fastener, such as 5b, having a pinching stress lower than that of fastener 5a is suitable to not hinder the pivoting ability due to the fastener 5a, said pinching stress being however sufficient to damp said pivoting motion when the arrangement is to attain its self-centering position.

I claim:

1. A self-centering thrust bearing assembly for a clutch including a driving unit, said assembly comprising:

two bearing rings with interposed rolling members, the first of said rings being intended to cooperate axially with said driving unit of said clutch;

an axially movable support sleeve with a flange, driven for the clutching operation, said second ring being mounted in sliding contact with said support sleeve with a certain radial freedom for the self-centering process; and resilient fastener means, said fasterner means being provided to exert a pinching stress on said second ring and said axially movable support sleeve, respectively, in order to maintain sliding contact between said second ring and said axially movable support sleeve, said resilient fastener means comprising:

two diametrically opposed fastening members exerting, respectively, a different pinching stress on said second bearing ring and said axially movable support sleeve so that the first of said fastening members constitutes a center of pivoting movement for said second bearing ring.

2. The self-centering thrust bearing assembly of claim 1, further comprising:

a control fork means operatively connected to said fastening members for controlling the axial displacement of said axially movable support sleeve during said clutching operation.

3. The self-centering thrust bearing assembly of claim 2, wherein said fastening members are positioned around the periphery of said axially movable support sleeve flange such that a portion of each said fastening members contacts said flange of said axially movable support sleeve, and wherein said control fork means includes prongs which contact said portion of each said fastening members when said control fork means is controlling said axial displacement.

* * * * *